Patented Jan. 3, 1933

1,892,889

UNITED STATES PATENT OFFICE

CLYDE O. HENKE, OF SOUTH MILWAUKEE, WISCONSIN, ASSIGNOR, BY MESNE ASSIGNMENTS, TO E. I. DU PONT DE NEMOURS & COMPANY, A CORPORATION OF DELAWARE

PROCESS OF PURIFYING ABIETENE-SULPHONIC ACID COMPOUNDS

No Drawing. Application filed May 25, 1931. Serial No. 540,008.

This invention relates to a process of purifying abietene sulphonic acid compounds, such as for example abietene-sulphonic acid itself, its water soluble salts, its aldehyde condensation products, and the analogous abietine or abietane derivatives.

In U. S. Patents Nos. 1,853,348; 1,853,352; and 1,853,353, issued on April 12, 1932, are described a number of sulphonation products of the abietene family such as abietene, abietine and abietane. In the copending application of myself and Charlton Serial No. 540,010 filed of even date herewith there are described a series of novel condensation products derivable from abietene sulphonic acids and aldehydes. In copending applications of Gubelmann and Goodrich Serial No. 431,628, of Gubelmann, Weiland and myself Serial No. 431,629 both filed Feb. 26, 1930 and of myself and Orthmann Serial No. 540,009 filed of even date herewith, are described technical applications of these various sulphonic acid compounds as wetting, dispersing and tanning agents.

I have now found that the utility of all these sulphonic acid compounds of the abietene family in any of the fields mentioned in the above referred to applications can be considerably improved by subjecting said compounds to an extraction treatment from aqueous solution by means of organic solvents. The improvement from such an operation is particularly pronounced where these sulphonic acid compounds are used as synthetic tanning agents or as wetting agents.

It is therefore an object of this invention to purify sulphonic acid compounds of the abietene family.

It is a further object of this invention to produce technically pure sulphonic acids of the abietene family having materially enhanced utility in the arts.

Other and further important objects of this invention will become apparent from the following description and appended claims.

The extraction may be performed by dissolving the sulpho-compound (free acid or alkali-metal salt) in water, and shaking the solution with a common organic hydrocarbon-solvent which is immiscible with water. The organic liquid is then separated from the aqueous phase in any suitable manner, for instance, by settling and decantation, and the aqueous phase either used directly in the industry, or else concentrated to a paste or evaporated to dryness.

The exact nature of the substances removed by my purifying treatment is not clearly understood, but it appears that a great portion of the impurities are hydrocarbons of the abietene family which have escaped sulphonation. The general process of isolating the sulphonic acid compounds during their preparation consists of diluting the reaction mass with water, separating the sulphonic acid layer, redissolving in water, and neutralizing. Due to the high dispersing and solubilizing powers of these sulphonic acid compounds or their water soluble salts, a part of the residual unsulphonated hydrocarbons goes into solution, and cannot be separated either by decantation or by crystallizing out the sulphonated compound. My novel method of extracting the sulphonated mass with an organic hydrocarbon solvent is as far as I am aware the first successful solution to the problem of separating the sulphonated compounds from the unsulphonated bodies entrapped therein or held in joint solution by the high solubilizing power of the sulphonated compounds.

Any commonly used solvent for hydrocarbons may be used in my process, provided it is immiscible with water at the temperature employed for the separation. Solvents such as benzol, xylol, petroleum-naphtha, chlorobenzol, carbon tetrachloride and the like have been tried and found to be satisfactory for my process.

Without limiting my invention to any particular procedure, the following example in which parts by weight are given, will serve to illustrate my method in its preferred form.

*Example*

500 parts of the neutralized oily sulphonation mass obtained of sulphonating abietene, isolating the oily product, dissolving it in water and neutralizing it with caustic soda (see for example, U. S. Patents 1,853,352 and 1,853,353) are dissolved in 2500 grams of water and shaken thoroughly with 700 parts of benzol. After standing overnight two layers are formed, the benzol forming the principal part of the upper layer. The lower aqueous layer is removed and extracted a second time with 500 parts of benzol. For nearly complete extraction a third extraction is necessary. After the third extraction the aqueous layer is evaporated to dryness. The resulting product, after powdering, is a slightly tannish colored powder. It analyzes 2.7% inorganic sulphur and 8.5% organic sulphur.

The extracted product has improved wetting properties over the unextracted material. Thus a 1% solution of the former will cause a 1 inch square piece of No. 6 canvas to sink in 14 seconds, while the sinking time for the unextracted material is about 25 seconds. Similarly, leather tanned by the aid of the extracted product according to the copending application of myself and Orthmann Serial No. 540,009 filed of even date herewith, possesses a better color than leather produced according to the same method but using the unextracted product.

Instead of benzol, any other of the organic solvents mentioned above may be used as extracting agent. The same process may also be applied to abietane-sulphonic acid or to the aldehyde condensation products of abietene-sulphonic acid. In any of these cases, the sulphonated compound subjected to extraction may be either in the form of its free acid, or in the form of a water-soluble salt thereof, for instance, the sodium salt.

In the extraction process above it is advantageous to use a rather dilute solution of the sulphonic acid body, as illustrated specifically in the above example. If a strong solution is used, the dissolved abietene-sulphonic acid body exerts a high solubilizing action on both its entrapped impurities and the extracting agent used and thus cuts down the efficiency of each extraction. However, wide latitude in the preferred concentration is available, without sacrificing completely the benefits of this invention.

If desired, the extracted solution may be used in the arts directly as obtained in the extraction process or after partial concentration, without complete evaporation to dryness.

Many other modifications and variations are possible in the practice of my invention as will be readily understood by those skilled in the art:

I claim:

1. The process of purifying sulphonation compounds of the abietene family which comprises extracting aqueous solutions of the said sulphonation compounds with a water immiscible inert organic liquid which is a solvent for hydrocarbons of the abietene family.

2. The process of improving the tanning qualities of sulphonation compounds of the abietene family, which comprises agitating an aqueous solution of the said sulphonation compounds with a water immiscible inert organic liquid which is a solvent for hydrocarbons of the abietene family and removing said liquid.

3. The process of purifying a water-soluble crude abietene-sulphonic acid compound, which comprises agitating an aqueous solution of the said crude compound with a water immiscible inert organic liquid which is a solvent for hydrocarbons of the abietene family, allowing the mass to settle into two layers, and separating the organic liquid layer from the aqueous layer.

4. The process of purifying the oily sulphonation mass obtained by a sulphonating abietene which comprises agitating an aqueous solution of the mass with benzol, allowing the aqueous phase to settle, separating the two layers and repeating the agitation of the partially purified aqueous mass with a fresh quantity of benzol.

5. As a new product, a sulphonation body of the abietene family, substantially free from unsulphonated hydrocarbons.

6. As a new product, a sulphonation body of the abietene family, substantially free from materials which are soluble in water-immiscible organic solvents.

7. As a new product, an abietene-sulphonic acid compound, substantially free from benzol-soluble matter.

8. The process of purifying sulphonation compounds of the abietene family which comprises extracting aqueous solutions of the said sulphonation compounds with a water immiscible inert organic liquid which is a member of the group consisting of benzol, xylol, petroleum-naphtha, chloro-benzol and carbon tetrachloride.

9. The process of purifying a water-soluble crude abietene-sulphonic acid compound, which comprises agitating an aqueous solution of the said crude compound with a water soluble inert organic liquid selected from the group consisting of benzol, xylol, petroleum-naphtha, chloro-benzol and carbon tetrachloride, allowing the mass to settle into two layers and separating the organic liquid layer from the aqueous layer.

10. As a new compound, the sulphonation body of the abietene family substantially free from materials which are soluble in water immiscible organic liquids which are members of the group consisting of benzol, xylol, petroleum-naphtha, chloro-benzol and carbon tetrachloride.

In testimony whereof I have hereunto subscribed my name at Carrollville, Milwaukee County, Wisconsin.

CLYDE O. HENKE.